2 Sheets—Sheet 1.

A. GORDON, J. H. MYERS, G. TELFORD & M. G. HUBBARD.
HARVESTER.

No. 187,616. Patented Feb. 20, 1877.

2 Sheets—Sheet 2.
A. GORDON, J. H. MYERS, G. TELFORD & M. G. HUBBARD.
HARVESTER.
No. 187,616. Patented Feb. 20, 1877.
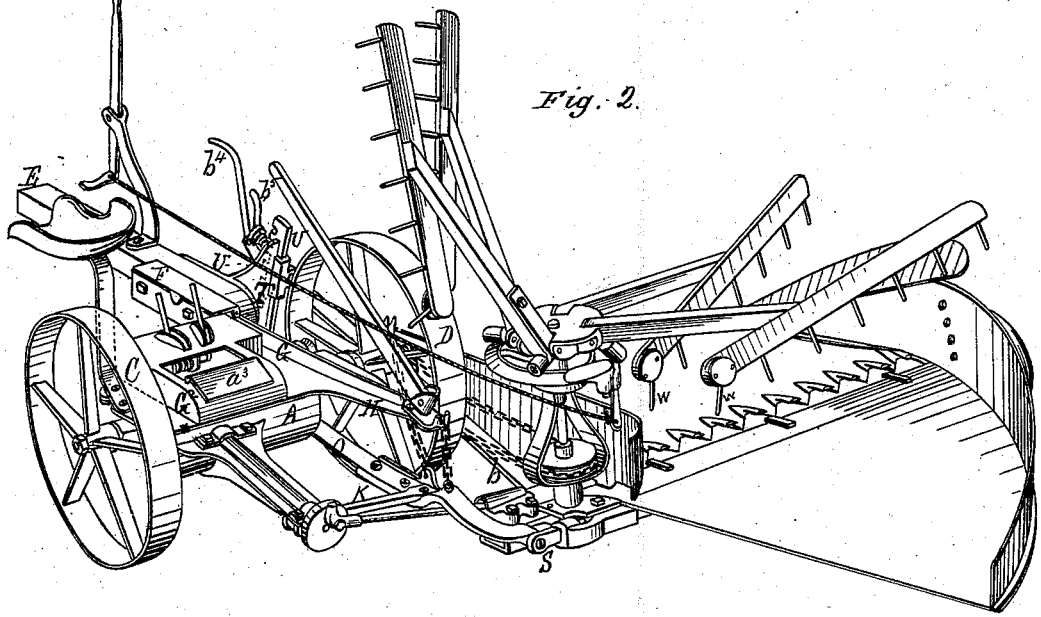
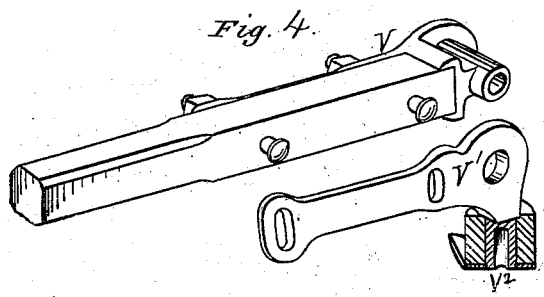
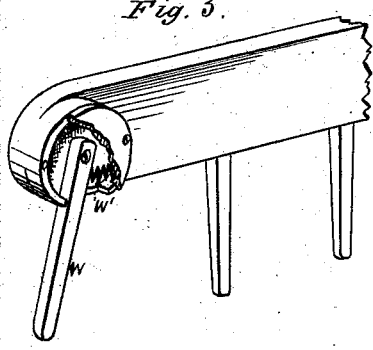

UNITED STATES PATENT OFFICE.

ALEXANDER GORDON, JACOB H. MYERS, GEORGE TELFORD, AND MOSES G. HUBBARD, OF ROCHESTER, ASSIGNORS TO JAMES I. HENDRYX, OF COOPERSTOWN, NEW YORK.

IMPROVEMENT IN HARVESTERS.

Specification forming part of Letters Patent No. 187,616, dated February 20, 1877; application filed February 28, 1873.

*To all whom it may concern:*

Be it known that we, ALEXANDER GORDON, J. H. MYERS, GEORGE TELFORD, and M. G. HUBBARD, of Rochester, county of Monroe, and State of New York, have invented a new and useful Improvement in Harvesters, of which the following is a full, clear, and exact description.

Our invention is designed to improve the combined mowing and reaping machine described in the patent of Moses G. Hubbard, No. 82,413, dated September 22, 1868, in some of its important details, to meet the requirements of farmers, especially those of the great grass and grain growing States, requiring combined machines.

Figure 1:
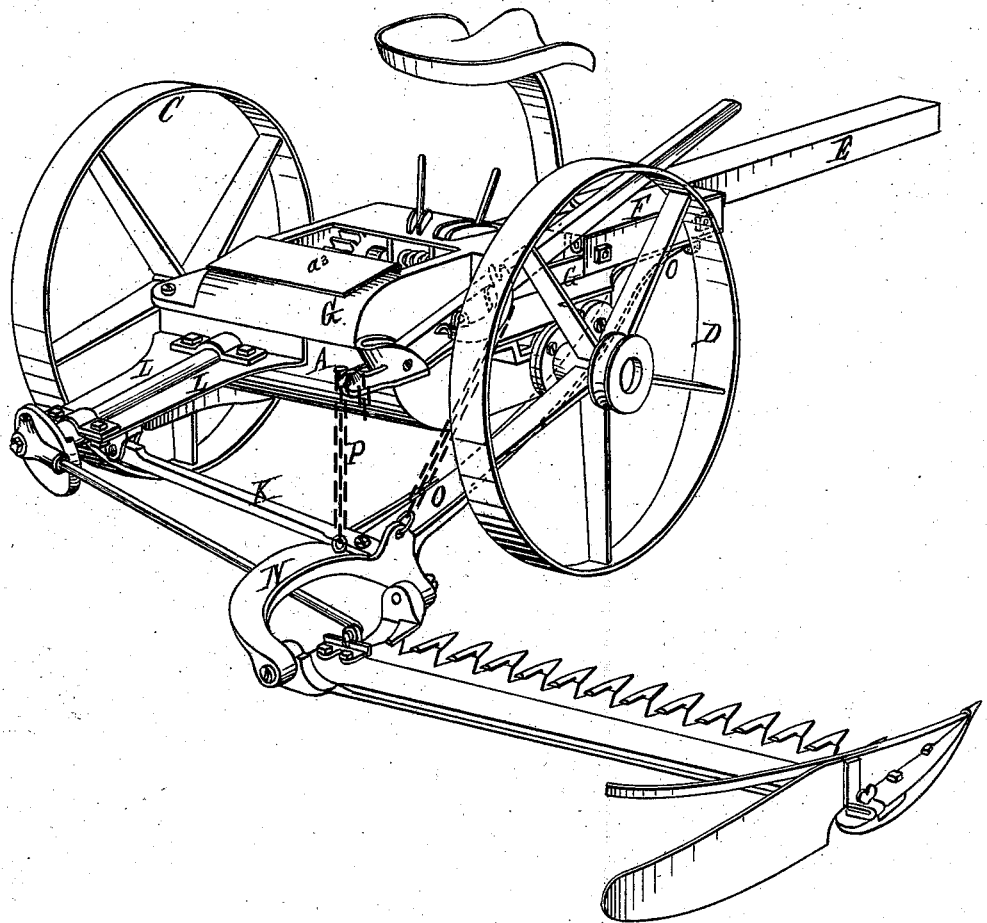
Figure 3:
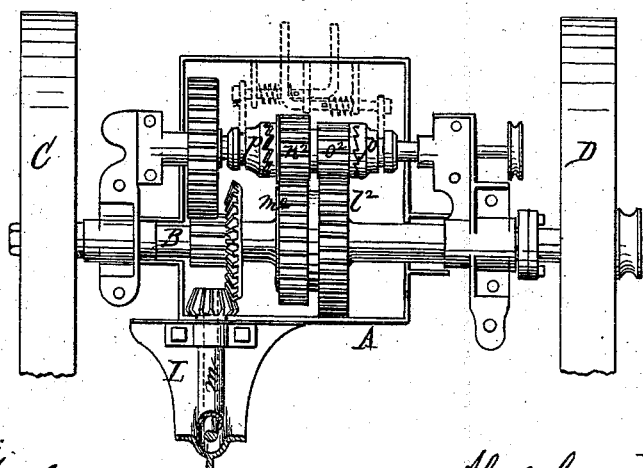

The drawings hereto attached are numbered and designated as follows: Figure 1 represents a perspective view of the machine as arranged for mowing. Fig. 2 represents a perspective view of the machine with the reaper attachments applied. Fig. 3 is a plan view of the gearing, showing the arrangement of the independent clutches, with the shifting-forks represented in dotted lines. Fig. 4 is a perspective view of the rake-straps, with the friction-roller and its hollow shaft or stud in section, and Fig. 5 is a perspective view of the inner end of one of the rake-heads, showing the connection and arrangement of the inner elastic rake-tooth.

The general nature of our improvements may be described as follows, viz.: We construct the main frame A entirely of cast-iron, in the peculiar form and manner hereinafter described, and we support this frame on the main shaft B, which is supported by the two large wheels C and D. In order to keep this main frame stationary we attach the tongue or pole E rigidly thereto, on the general plan of the said "Hubbard machine." In order to get an economical "pole-extension," (described in the said patents of the said Hubbard,) to which to bolt the pole, we locate the "tool-box" in the position formerly occupied by the front end of the pole-extension, as shown at F, and, being cast on the strong rib G, which extends back along the lever-arm H, it answers the double purpose of the tool-box and pole-extension. Near the front end of this tool-box we have several holes to permit the adjustment of the height of the front end of the pole for the different heights of teams.

In order to adapt the machine to the two processes of mowing and reaping, the pole can be bolted onto the left side of the tool-box for mowing, and on the right side for reaping.

We have found it difficult to make a wooden frame that will not warp out of line and cramp the gearing, and shrink so as to loosen the parts, and we find that a wooden frame requires so many separate pieces that, unless prepared and put together in a very expensive way, the parts will work loose and get out of order.

We have, therefore, perfected a style of cast-iron main frame, as shown in the drawings, which unites simplicity of construction and great strength with lightness and cheapness, and this style of frame gives the machine much greater durability, especially on the praries of the West, where it is often necessary to leave it exposed to the weather.

To support the crank-wheel and the inner end of the finger-bar extension or brace K we extend the strong tapering arm L back the requisite distance to properly locate the crank-wheel. The tapering arm L is made in trough shape, to give it greater strength, and to hold the crank-shaft box or tube m, which is made the whole length of the crank-shaft, and bolted in the groove of said arm through ears cast upon it, as shown.

One end of the extension-iron K is pivoted to the rear end of the trough-shaped crank-supporting arm L in front of the crank-wheel, and the other end is bolted to the wear-plate N in front of the pitman. This is important, in that it shields the pitman from obstacles, and aids in prostrating the cut grass before it comes in contact with the pitman, around which it would be liable to wind, and thereby to obstruct its working. This combination of the crank-shaft-supporting arm L, extension-iron K, and wear-plate N thus becomes a practical improvement upon the Hubbard machine, and is one of great value.

The rear end of the surface-spring O is bolted to the wear-plate N, and its front end is attached to the under side of the tool-box F, forming what is commonly called "Hubbard's elastic hinge-connection," to which the cutting apparatus is hinged, substantially as shown in said Hubbard's patent, above referred to.

By thus combining the surface-spring O, the wear-plate N, the extension-iron K, and the crank-arm L, we are enabled to dispense with the long horn which formerly extended from the crank-box out and around the crank-wheel for supporting the extension-iron and the rear end of the elastic hinge-connection.

We locate the "Hubbard self-sustaining lever" on the rear end of the lever-arm H in a socket formed for its reception, and connect it by a chain with the wear-plate in the usual way.

When it is desired to carry the inner end of the cutting apparatus above the ground, we use the adjusting-chain P, attached at its lower end to the wear-plate, and at its upper end in a fork or jaw adapted to receive its links, for convenience in hooking and unhooking.

In order to convert the machine into a reaper we change the pole to the right-hand side of the tool-box and attach the tilting-post, as shown at U, and detach the mowing cutting apparatus. We then attach the inner end of the extended and wide cut reaping attachment by the rolling ear S to the rear end of the wear-plate by a bolt, so as to form one joint on which the platform may be tilted, and one on which the outer end may rise and fall. We then slide the tilting-jaw T on the tilting-post U, and a reaping-machine is formed of the best proportions for harvesting grain.

Experience has shown that the swath cut in grain may be considerably wider than in grass with the same power. We therefore make our reaping cutting apparatus about one-fourth wider.

For delivering the grain in gavels around onto the ground, we prefer the sweep-rake side-delivering reaping attachment, with any of the ordinary modifications of the Dorsey sweep automatic rakes, and in order to give the inner end of the rake sufficient movement or sweep to do good work, it is necessary to extend the attachment so that the inner cutter or line of cut shall be about fifteen inches farther out than it is for mowing, and extend the reaping cutter-bar (without cutters) from that point into the inner end of the finger-beam to a suitable point to connect with the ordinary mowing-pitman. By this extended reaping-platform and finger and cutter bars we get a range of movement for the inner end of the rake, which sweeps in all the cut grain and delivers it effectually. This arrangement is known as the Hubbard extended reaping attachment. The movable pole in this connection secures another very important advantage in removing the side draft, which would result from extending the reaping attachment if the pole remained in the same position as the mowing, but the construction permits the moving of the pole to the right-hand side of the tool-box (or pole-extension) as described, thus making a wide-cut reaper as free from side draft as the mower.

We have given this subject of side draft a large amount of experiment, and have found no other effectual way to change an ordinary-cut mower into a wide-cut reaper, except to move the pole to the right in proportion as we widen the cut of the machine; and we should make the extended reaping attachment and this arrangement for moving the pole, if for no other purpose than to remedy the side draft, which would otherwise exist, while the arrangement described accomplishes not only the removal of the side draft, but also the increased movement or sweep of the inner end of the sweep-rake, and consequently more perfect work.

The gear-cover $G^2$ we bolt to the frame A, and thus effectually close all the gearing to protect it from dirt, &c. This cover has a small door, $a^3$, in its top, which may be opened to oil the gearing, and for other purpose.

The wheels $l^2$ and $m^2$ are the two main differential gears. They gear into the two pinions, $n^2$, and $o^2$, and by means of gear-shifters and the ratchet-clutches $p$ $p'$ feathered to their shaft, may be made to change the speed of the cutters. One of our improvements consists in combining with this differential gear two clutches and two independent shifting-forks or levers, one for each of said clutches, so that each clutch may be independently connected with, or disconnected from, its pinion.

If the ratchet-clutch is engaged with the larger pinion the machine will be in gear on its low speed; and if with the smaller pinion, the machine will be in gear on its high speed.

By the use of the independent shifters in connection with the ratchet-clutches the speed of the cutters can be changed without throwing the machine out of gear—as, for example, if the cutters are being driven at the lower rate of speed, and it is desired to apply the higher rate without disturbing the connection of the low-speed gearing, the smaller pinion is clutched to its shaft and immediately starts the cutters at the higher speed, the ratchet-clutch connecting with the larger pinion, simply acting as a backing-ratchet until the smaller pinion is disengaged, when the larger one does the work, as before.

When both clutches are disconnected from their respective pinions, the machine is out of gear. We prefer about twenty-seven revolutions of the crank-shaft to one of the main axle for the high speed, and about two-thirds of that number for the low speed.

Our changeable-speed driving-gear may be very advantageously applied for driving the ordinary reel-rake with the reel used in connection with the ordinary dropper attachment, or the form of rake shown in the drawings, known as the Dorsey rake; but this feature being made the subject-matter of a separate application for a patent, it need not be further described here.

Another part of our improvement consists in a novel construction of the straps V V$^1$ or angle-iron, to which the rake-arms and friction-rollers are connected, and through which the arms are pivoted to the revolving head. The strap V is provided with a socket for the reception of the closely-fitting end of the rake-head, at the heel end of which is a bolt sleeve or tube extending far enough to form a bearing for the strap V$^1$, and forming a long bearing for the pin or bolt upon which the rake is pivoted. Upon one of the straps we cast a hollow stud, V$^2$, forming the bearing for the anti-friction roller, this form of the stud adapting it with the rest of the strap to be malleableized, and thus rendered less liable to fracture. The bolt-holes in the straps are elongated slightly in the arc of a circle, of which the pivoted pin is the center, to permit the adjustment of the angle of the roller stud or arm to the rake, for varying the height of the rakes relatively to the platform in passing over the same.

Another feature of the improvement consists in setting the inner rake-tooth at an angle projecting inward, so as to sweep the angle or corner formed at the junction of the platform and the inner grain guard or board, while at the same time making it elastic, so as to yield for preventing it from being broken in case it should come in contact with the drive wheel or frame in passing over the same, as it would be liable to do in the organization of the combined machine, as shown, in which the rake-shaft is necessarily in close proximity to the (inner) drive-wheel than in the usual one-wheel rigid-bar machine, as ordinarily constructed for reaping only. The inner tooth $w$ referred to is pivoted to the inner end of the rake-head, and projects inward and downward, held at the desired angle to the rake-head by a stop and a spring, $w^1$, which, when the tooth strikes the drive-wheel or other obstructions in its path, allows the tooth to yield until the obstruction is passed, when it immediately resumes its former working position.

The joint between the cutter-bar head and the pitman is liable to become entangled and clogged by grass or straw wrapping around it, and to prevent this we locate it behind the inner drive-wheel, which presses the grass and straw down in front of it, and further protect it by applying an inverted U-shaped hood over the joint and sickle head, covering the entire throw of the latter.

In order to support the inner end of the reaping attachment, and for convenience in tilting it for cutting lodged crops we attach to its inner end a long bar or lever of iron, $b$, which we designate the tilting-bar. This tilting-bar projects forward and passes through the tilting-jaw T forming the front hinge, and then turns up into a convenient handle, $b^4$. The jaw T, with its spring engaging-pawl $b^5$, slides on the ratcheted tilting-post U, as before described. The tilting-post U is attached to the side of the pole by the same bolts which secure the pole to the tool-box.

By the arrangement above described the driver, by pressing with his foot upon the pawl $b^5$ can readily disengage it from the ratchet, when the reaper attachment will tilt by its own weight, depressing the guards and cutters and adapting them to pick up and cut lodged crops. They can be readily raised again by the operator by means of the handle $b^4$. This arrangement gives a wide hinge for the reaper-platform, extending from the rolling-bolt S to the tilting-jaw T, imparting great strength and steadiness to the reaping attachment, while, at the same time, permitting the instantaneous dropping of the cutters in lodged spots without interfering with the management of the team by the driver. The deep vertical rib G, cast on the side of the frame and extending from the tool-box to the lever-arm, so connects the two and stiffens the frame as to give it the requisite strength to support the cutting apparatus when raised.

Having now described our improvements, what we claim as new, and desire to secure by Letters Patent, is—

1. The tool-box, constructed and arranged relatively to the main frame, substantially as described, whereby it is made to constitute the pole-extension arm of said main frame, in combination with the transferable pole, adapted to be applied to either side of the tool-box, substantially as and for the purpose set forth.

2. The metallic main frame A, provided with the tool-box pole-extension F, lever-arm H, and back-bone rib G, extending between said pole and lever-arms, and forming a part of said frame and arms, as described.

3. The tilting-handle $b$, sliding jaw T, and spring-retaining pawl $b^5$, in combination with the rack or post U, all arranged and operating substantially as described.

4. The plate or jaw to which the lifting-lever is pivoted applied to the lever-arm H, and provided with the socket for the lifting-lever, and the fork or hook adapting the chain for adjusting the height of the cutting apparatus to be readily attached and detached, substantially as and for the purpose described.

5. The rake strap or iron V, provided with the socket and tube for the pivoted pin or bolt cast thereon, as described.

6. The rake-head strap or iron V¹, provided with the hollow stud for the friction-roller cast thereon, substantially as and for the purpose set forth.

7. The elastic inner rake-tooth W, arranged obliquely to the rake-head for sweeping the inner corner of the platform, and operating substantially as and for the purpose set forth.

In testimony whereof we have hereunto set our hands this 21st day of February, A. D. 1873.

ALEX. GORDON.
J. HIRAM MYERS.
GEORGE TELFORD.
M. G. HUBBARD.

Witnesses:
  H. D. GORDON,
  E. R. OTTOWAY.